Sept. 7, 1926.
W. M. BAXTER
1,598,844
REMOVABLE TRUCK BODY OPERATING MECHANISM
Filed Feb. 1, 1923 3 Sheets-Sheet 1
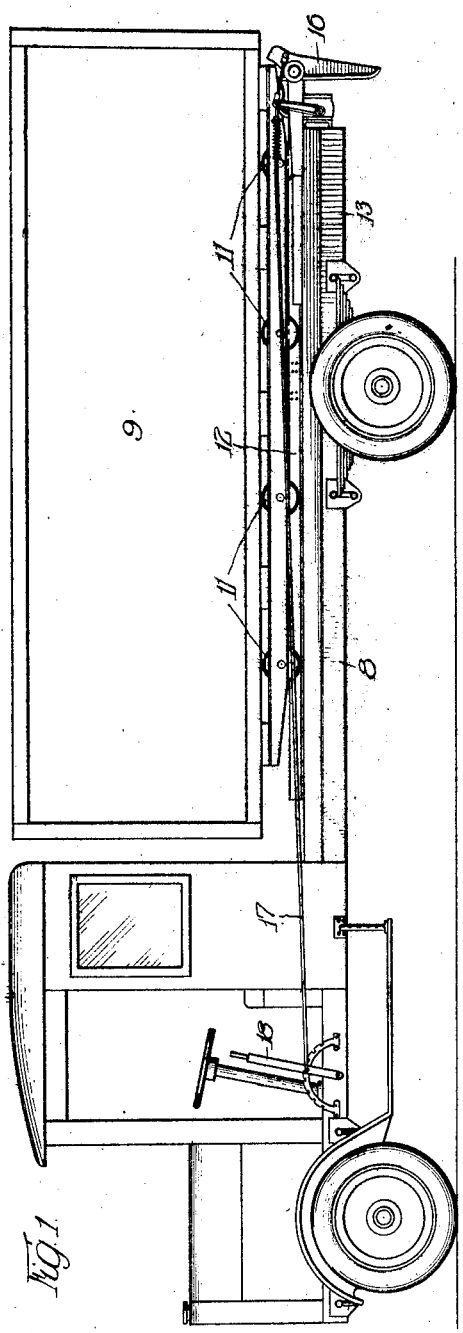
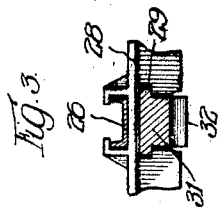
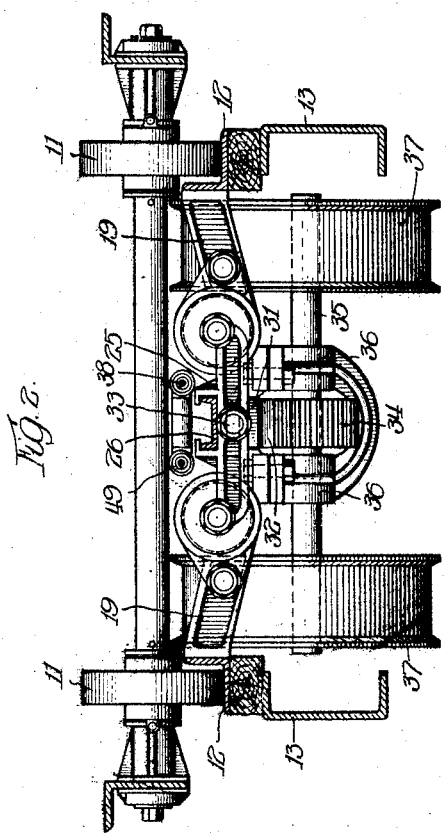
Witness:
R. Burkhardt
Inventor:
William M. Baxter
By Ira J. Wilson Atty

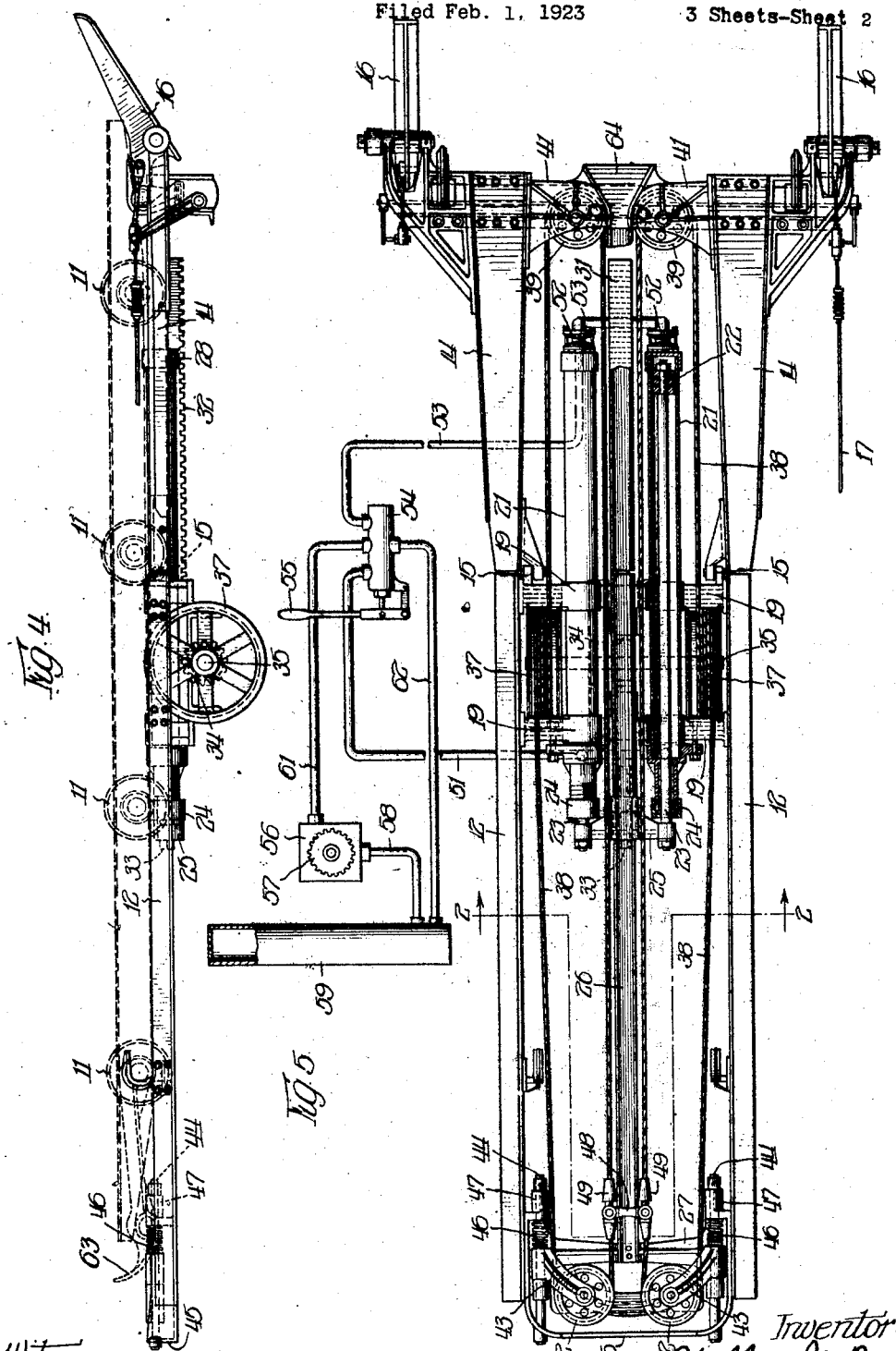

Sept. 7, 1926.  W. M. BAXTER  1,598,844
REMOVABLE TRUCK BODY OPERATING MECHANISM
Filed Feb. 1, 1923  3 Sheets-Sheet 3
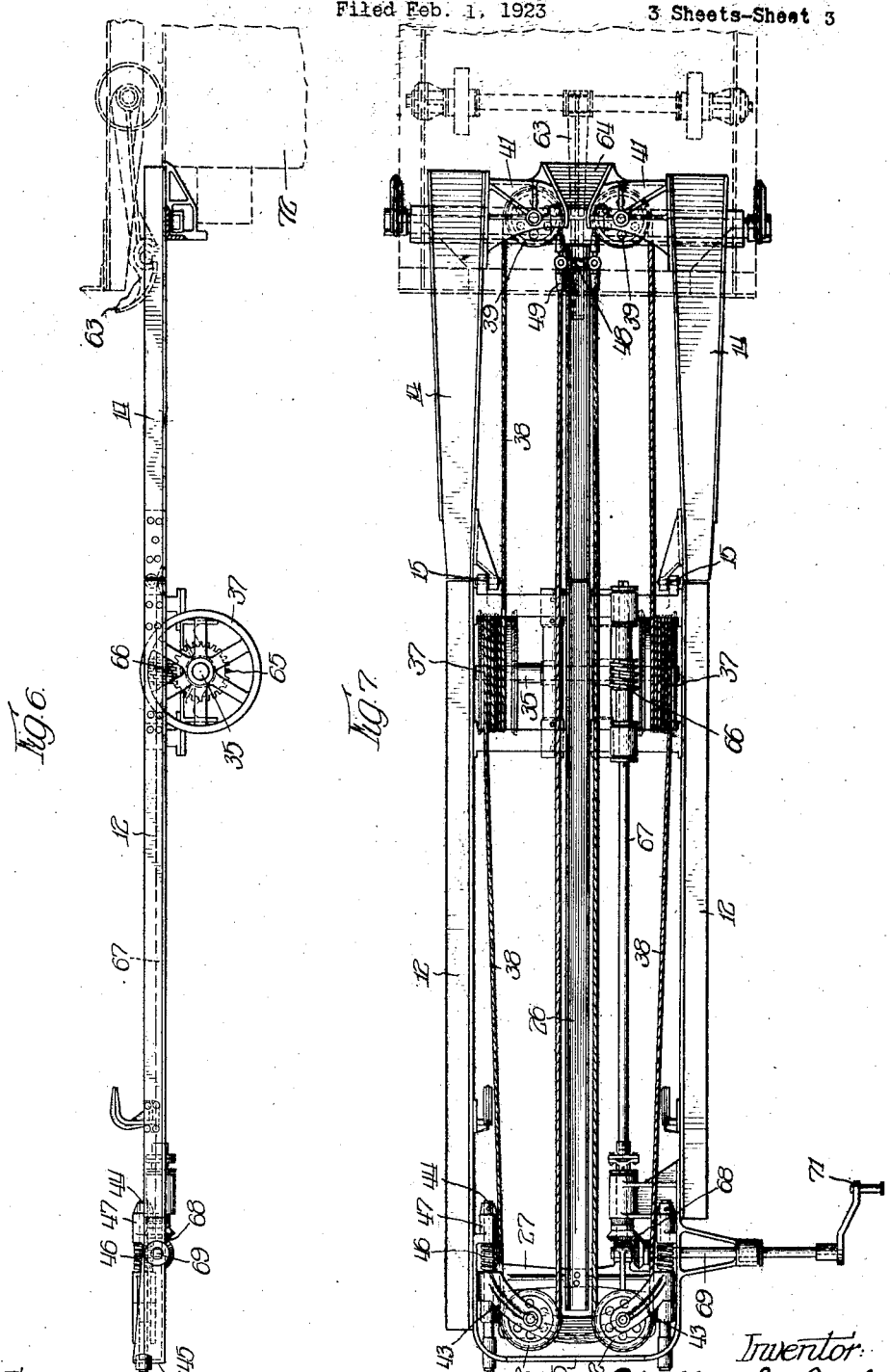

Patented Sept. 7, 1926.

1,598,844

UNITED STATES PATENT OFFICE.

WILLIAM M. BAXTER, OF CHICAGO, ILLINOIS, ASSIGNOR TO IDEAL REMOVABLE BODY COMPANY, OF CHICAGO, ILLINOIS, A CORPORATION OF ILLINOIS.

REMOVABLE TRUCK-BODY-OPERATING MECHANISM.

Application filed February 1, 1923. Serial No. 616,234.

This invention pertains to trucks of the removable body type, and relates more particularly to the mechanism by which the body is moved onto and off from the truck chassis.

In the use of trucks of this character, the chassis is backed up to a loading platform, whereupon the body, either loaded or unloaded, as the case may be, is rolled from the chassis onto the platform and is replaced by another body, which is rolled from the platform onto the chassis. This invention relates to the mechanism by which the movements of the bodies off from and onto the chassis are effected.

One of the primary purposes of this invention is to provide mechanism for this purpose which will be sufficiently strong, durable and powerful to positively move the bodies, even when heavily loaded, from the chassis onto the platform, and also from the platform onto the chassis, thereby enabling an exchange of bodies, which, because of their weight when loaded, could not be conveniently rolled onto and off from the chassis by hand.

Another object of the invention is to provide a mechanism of the character indicated which will be relatively light in weight, so as not to unduly encumber the chassis, and also one which will be devoid of gearing and other complicated mechanism, which might readily get out of order.

A further object is to provide a mechanism which will possess inherent flexibility so as to maintain its operative connection with a truck body during its movements from the platform onto the chassis, or from the chassis onto the platform, as the case may be, even though said platform may be at a different level than the rear end of the chassis, with the result that the body is caused to tilt relatively to the chassis during the loading or unloading movements.

Other objects and advantages of this invention should be readily appreciated as the same becomes better understood by reference to the following description, when considered in connection with the accompanying drawings.

Referring to the drawings:—

Fig. 1 is a side elevation of a removable body truck equipped with my invention;

Fig. 2 is a transverse sectional view taken substantially on the line 2—2 of Fig. 5;

Fig. 3 is a fragmentary sectional view showing one of the rack guides;

Fig. 4 is a side elevation of the chassis frame with a body positioned thereon;

Fig. 5 is a plan view of a chassis frame equipped with my invention;

Fig. 6 is a view generally similar to Fig. 4, but disclosing a manual instead of a hydraulic operating mechanism; and, Fig. 7 is a plan view of the construction shown in Fig. 6.

Referring now to the drawings more in detail, and particularly to Figs. 1 to 5, inclusive, reference character 8 indicates generally the frame structure of a truck chassis upon which a body 9 is removably mounted. The body 9 is carried upon a plurality of pairs of rollers 11, adapted to travel and rest upon tracks 12 mounted upon the side members 13 of the chassis frame. The rear portions 14 of these track members are preferably channel shaped, and of increased width toward their rear ends, as will be apparent from Fig. 5, and these portions are pivoted at 15 to the chassis frame in order that their rear ends may be elevated by the shoes 16 which project rearwardly from the chassis and are controlled through a rod or cable 17 from a lever 18, all as described more in detail in my co-pending application, Serial No. 610,245, filed January 2, 1923.

Between the tracks of the chassis I have mounted in suitable supporting brackets 19 a pair of cylinders 21, within each of which is disposed a piston 22 connected to a piston rod 23 extending through a suitable stuffing box 24 at one end of the cylinder. The two piston rods 23 are connected together by a crosshead 25 which is shaped to slidingly engage and be guided in its movements by a channel shaped guide 26 extending longitudinally of the chassis, and fixedly attached to cross-members thereof, the forward one of which is shown in Fig. 5 and indicated by reference character 27. Another of the cross-members is shown at 28, Figs. 3 and 4, and this member is shaped to provide a guideway 29, in which a T-shaped rack 31, provided on its lower face with rack teeth 32, is adapted to slide longitudinally of the chassis. The forward end of this rack is connected by a bolt 33, or otherwise, to the crosshead 25 so that upon movements of the crosshead longitudinally of the chassis, the rack 31 will be similarly moved.

The teeth of the rack are adapted to mesh with and actuate a gear wheel 34, fixed upon a shaft 35, which is supported in suitable hangers 36 beneath the rack, and carries near each end a drum 37. Longitudinal movement of the rack will, therefore, through the intermediary of the gear 34 and shaft 35, impart a rotary movement to these drums for a purpose which will later be explained.

A cable 38 is wound several turns around each drum and these cables each pass over a pulley 39 mounted at the rear of the chassis in a bracket 41, and also pass at the forward end of the chassis around a pulley 42, each mounted in an arm or bracket 43 slidably disposed upon a rod 44, each rod being supported in a yoke 45 fixed to the frame of the chassis. Tension upon the cables is maintained by coiled springs 46 surrounding the rods and interposed between the brackets 43 and the rod supports 47, as will be apparent from Fig. 5. It will be noted from this figure that the inner laps of the cables extend in parallelism longitudinally of the chassis in proximity to the channel member 26, and these laps of the cables are connected together by a crosshead 48, which is attached at its ends to anchors 49, fixedly secured upon their respective cables. Rotation of the drums 37, in one direction or the other, will therefore cause the crosshead 48 to travel longitudinally of the chassis, and since the removable body is connected to this crosshead, as will be later explained, it will be apparent that such movement of the crosshead will move the body onto or off from the chassis, depending upon the direction of movement of the crosshead.

Various mechanisms may be employed within the scope of my invention for imparting such rotary movement to the drums, but in Figs. 1 to 5, inclusive, I have shown for purposes of illustration, hydraulic mechanism, including the cylinders and pistons previously described, by which the desired movement of the crosshead 48 is very effectively, efficiently and satisfactorily produced. The mechanism for hydraulically actuating the pistons 22 may vary materially in its detailed construction, but for illustrative purposes I have shown in Fig. 5, somewhat diagrammatically, one suitable form of mechanism, which will now be described. The forward end of each cylinder 21 is connected to a pipe 51, and the rear end of each cylinder is similarly connected through a leak proof expansion joint 52 with a pipe 53. The pipes 51 and 53 communicate at their other ends with a valve casing 54, in which there is disposed a suitable controlling valve adapted to be manually actuated and controlled by a hand lever 55. An oil pump 56, equipped with a driving pinion or a pulley 57 adapted to be power driven from any suitable source of power, such, for instance, as the motor of the vehicle, has its suction side connected through a pipe 58 with a liquid, preferably oil, containing supply reservoir 59. The liquid is discharged from the pump under pressure through a pipe 61 to the valve casing 54, and when no movement of the pistons 22 is required, the valve is positioned so that the liquid flows directly from the casing 54 through a return pipe 62 back to the reservoir 59.

The forward axle of the removable body, shown in dotted lines in Fig. 4, is equipped with a forwardly projecting hook or connecting member 63 adapted to engage with the crosshead 48, whereby connection between the crosshead and the body is established, so that any movement of this crosshead causes a similar movement of the body relatively to the chassis. Assuming that a body is in position on the chassis, as illustrated in Fig. 1, and that the chassis has been backed up to a loading and unloading platform, and that it is desirable to move the body from the chassis onto the platform, the control lever 55 is manipulated to move the valve in the casing 54 so as to establish communication between the pipe 61 and the pipe 53, and also between the pipe 51 and the pipe 62. The fluid under pressure delivered by the pump 56 will now enter the rear ends of cylinders 21, forcing the pistons 22 forwardly. The crosshead 25 connecting the piston rods 23 will therefore move forwardly, carrying with it the rack 31, which, through the intermediary of the gear 34, will revolve the drums 37 in a counter-clockwise direction, viewing Fig. 4, thereby causing the parallel inner laps of the cables to travel rearwardly, and thus through the crosshead 48 and the connecting hook 63, the body is rolled rearwardly along the tracks off from the chassis and onto the platform. The body may then be rolled on the platform to any desired place, or into the warehouse, and another body which is to be transported by the truck is rolled to the edge of the platform so that its hook 63 can be engaged with the crosshead 48. To assist in the guiding of the body onto the chassis, the rear portions of the tracks are flared, as previously mentioned, and the rear end of the channel member 26 is also flared, as indicated at 64 (Fig. 5), to facilitate the entrance of the hook into the channel member. When the hook has been connected to the crosshead 48, the lever 55 is actuated to reverse the operation of the mechanism; that is, pipes 51 and 61 are now connected through the casing 54 to deliver the fluid under pressure to the forward ends of the cylinder, while pipes 53 and 62 are likewise connected to convey the liquid discharged from the rear ends of the cylinders back to the reservoir 59. Rearward movement of the pistons and the rack 31 will cause the drums to revolve in the opposite direction, thereby, through the cables, moving the crosshead 48 toward the front end of the chassis, and the body is thereby dragged from the platform onto the chassis. Flexibility of the apparatus to avoid breakage is imparted, and proper tension on the cables is maintained through the yieldability of the front pulleys 42 afforded by the springs 46.

While two cables and drums, and two hydraulic cylinders have been shown and described, it should be apparent that for lighter work one might suffice; whereas, in very heavy trucks more than two might in some instances be desirable.

Other changes in the structural details shown and described may obviously be resorted to within the scope of the invention.

In Figs. 6 and 7, I have illustrated, in lieu of the hydraulic mechanism, a manually operable mechanism for actuating the drums 37. In this instance the shaft 35 is equipped with a worm wheel 65 adapted to be driven by a worm 66 carried by a shaft 67 extending longitudinally of the chassis and connected through a pair of bevel gears 68 with a shaft 69 adapted to be manually rotated by crank 71. By means of this mechanical operating mechanism the desired movement may be imparted to the crosshead 48, and this apparatus will be found quite practical for the lighter weight trucks. In Figs. 6 and 7, I have also shown in dotted lines a portion of a loading platform 72, and a truck body is shown in position to be drawn onto the chassis.

It is believed that the construction, operation and many of the attendant advantages of my invention will be understood from the foregoing without further description, and it should also be understood that the invention is not circumscribed by the structural details shown, as it is capable of embodiment in materially different structures.

I claim:—

1. In a mechanism of the character described, the combination of a chassis, a plurality of pulleys at the front and rear ends of said chassis, a plurality of drums mounted centrally of said chassis, cables wound around said drums and trained over said pulleys at the front and rear of said chassis, means for detachably connecting a removable body to said cables, and means for rotating said drums simultaneously to move said cables and a body connected thereto longitudinally of the chassis.

2. In a removable body truck of the character described, a chassis, a pulley at each end of said chassis, a drum mounted substantially centrally of said chassis, a cable wound about said drum and trained over said pulleys at the front and rear of said chassis, means for detachably connecting a removable body to said cable, and means for reversibly rotating said drum to move said cable to reciprocate the body connected thereto along said chassis.

3. In a mechanism of the character described, the combination of a chassis, a pair of drums mounted thereon, a pair of cables wound around said drums and trained over pulleys at the forward and rear ends of said chassis, a crosshead connecting the parallel laps of said cables, and means for rotating said drums to move said crosshead longitudinally of the chassis.

4. In a mechanism of the character described, the combination of a chassis, a pair of drums rotatably mounted thereon, a pair of endless cables connected with their respective drums, pulleys at the forward and rear ends of said chassis around which said cables extend, a crosshead connecting the opposed laps of said cables, and a channel member extending longitudinally of the chassis beneath said crosshead.

5. In a mechanism of the character described, the combination of a chassis, a pair of drums mounted thereon, a channel member extending longitudinally of the chassis, a crosshead adapted to travel in proximity to said channel member, and cables connecting said crosshead with said drums whereby the crosshead may be positively moved in both directions longitudinally of the chassis.

6. In a mechanism of the character described, the combination of a chassis, a channel member extending longitudinally thereof, a crosshead movable in proximity to said channel, a body connecting member adapted to engage said crosshead, and means for moving said crosshead, the rear end of said channel member being flared to facilitate the entrance of said connecting member into said channel member.

7. In a mechanism of the character described, the combination of a chassis, a pair of drums mounted thereon, endless cables connected with said drums, pulleys mounted at the rear end of said chassis over which the cables are trained, pulleys yieldably mounted at the forward end of said chassis over which said cables are also trained, a crosshead connecting said cables, and hydraulic means for rotating said drums.

8. In a mechanism of the character described, the combination of a chassis, a drum mounted thereon, a cylinder, a piston therein, a gear wheel connected with said drum, a rack connected with said piston and meshing with said gear wheel, and hydraulic means for actuating said piston to thereby revolve said drum.

9. In a mechanism of the character described, the combination of a chassis, a pair of drums mounted thereon, a gear connected to said drums, a rack meshing with said gear, a crosshead connected to said rack, a pair of hydraulically operable pistons connected with said crosshead, a pair of endless cables connected with their respective drums, and a connection between said cables adapted to be moved longitudinally of the chassis upon actuation of said pistons.

10. In a mechanism of the character described, the combination of a chassis, a removable body, and means for positively moving said body onto and off from said chassis, said means comprising a pair of hydraulically operable drums, cables connected thereto, a crosshead movable by said cables and a connection between said crosshead and said body.

11. In a mechanism of the character described, the combination of a chassis, a pair of drums mounted thereon, pulleys at the front and rear ends of said chassis, cables secured to said drums and trained around said pulleys, springs acting upon certain of said pulleys to maintain tension on said cables, a crosshead connecting the cables, and means for rotating the drums.

12. In a mechanism of the character described, the combination of a chassis, a pair of drums mounted thereon, a pair of hydraulically operable pistons, a crosshead connecting said pistons, a rack connected to said crosshead, means for guiding said rack in its reciprocatory movements, a gear meshing with said rack and connected with said drums, cables connected with their respective drums, pulleys at the front and rear of said chassis around which said cables are trained, means for maintaining tension on said cables, and a cross-head connecting the cables.

WILLIAM M. BAXTER.